Nov. 4, 1958    R. G. WHITE    2,859,330
AIR-OPERATED SPOT WELDING DEVICE
Filed May 28, 1957    3 Sheets-Sheet 1
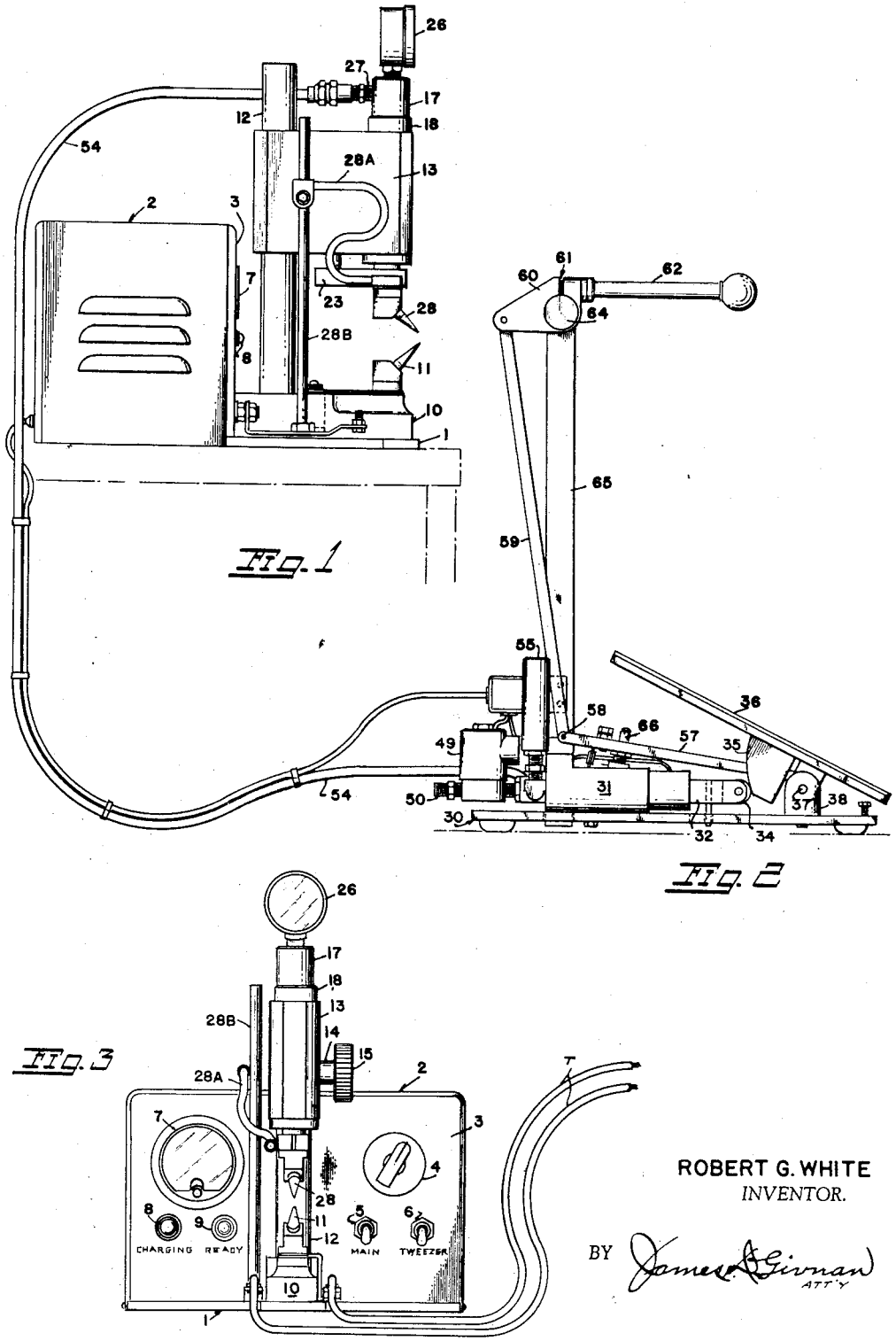
ROBERT G. WHITE
INVENTOR.
BY James A. Girman
ATT'Y Nov. 4, 1958   R. G. WHITE   2,859,330
AIR-OPERATED SPOT WELDING DEVICE
Filed May 28, 1957   3 Sheets-Sheet 2
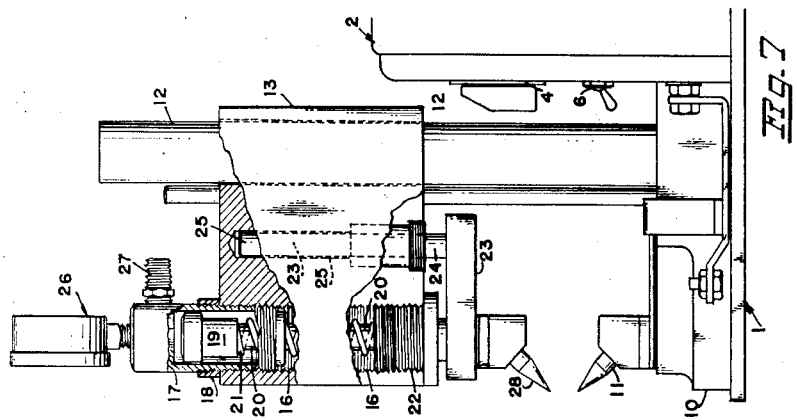
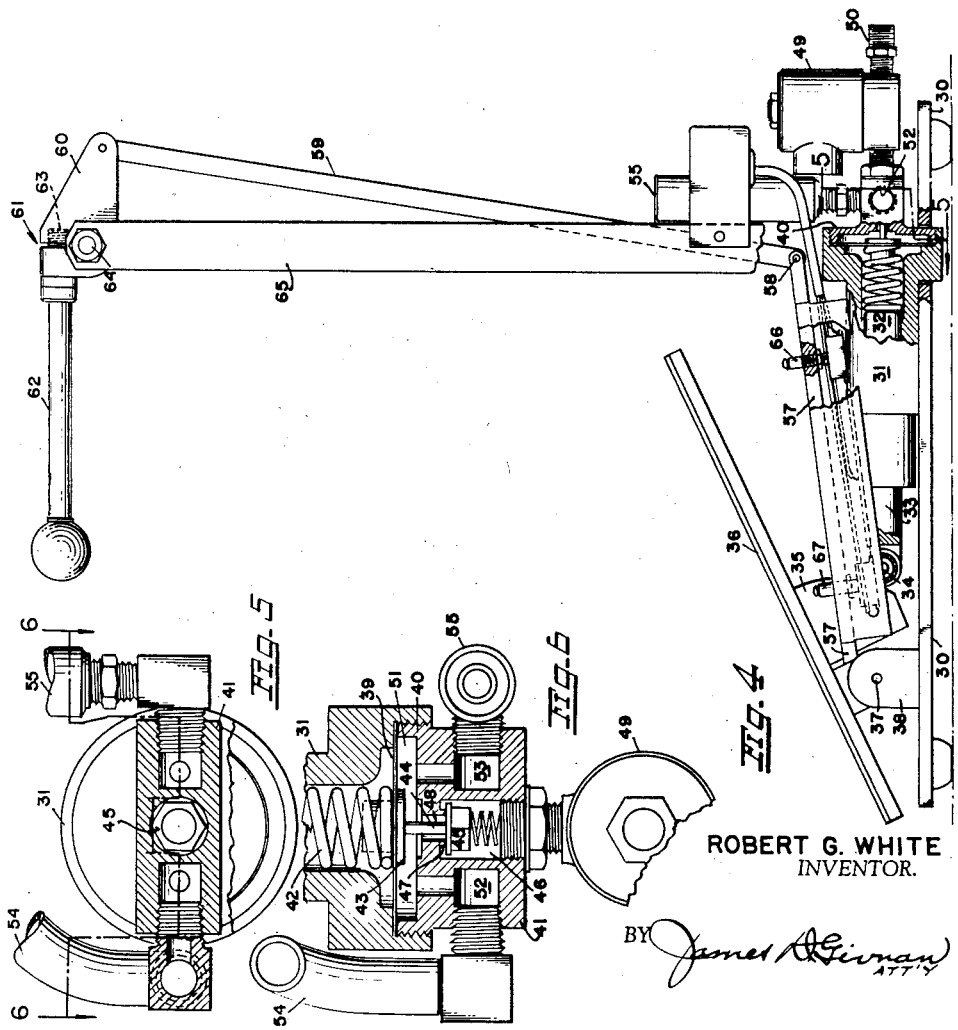
ROBERT G. WHITE
INVENTOR.

Nov. 4, 1958   R. G. WHITE   2,859,330
AIR-OPERATED SPOT WELDING DEVICE
Filed May 28, 1957   3 Sheets-Sheet 3
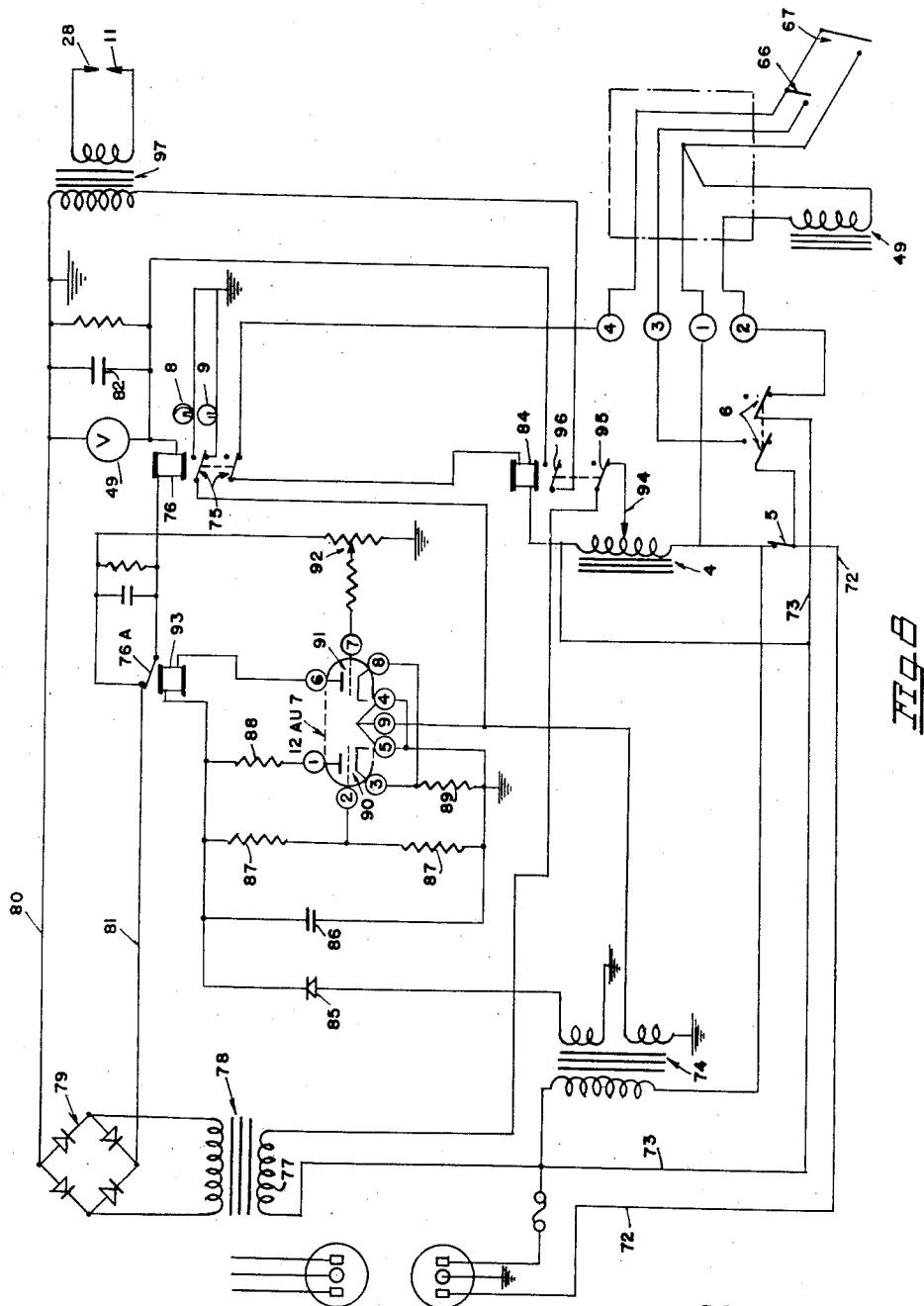
ROBERT G. WHITE
INVENTOR.

United States Patent Office 2,859,330
Patented Nov. 4, 1958

2,859,330

AIR-OPERATED SPOT WELDING DEVICE

Robert G. White, Portland, Oreg.

Application May 28, 1957, Serial No. 662,135

4 Claims. (Cl. 219—89)

This invention relates to an air operated electric spot welder and pedal-operated control unit therefor.

One of the principal objects of the invention is the provision of a combination of this character wherein the welding electrodes are capable of being forced by pedal-controlled air-actuated means against opposite sides of workpieces of various thicknesses under the proper amount of welding pressure required for and determined by the thickness of the workpiece being dealt with and wherein electrical welding current of proper voltage is supplied to the electrodes by actuation of said pedal means when said degree of welding pressure has been reached.

The foregoing and other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1 and 2 are side views respectively of an air-operated spot welding device and control unit therefor both made in accordance with my invention.

Figure 3 is a front view of Figure 1 and showing attached thereto a pair of electrical conductors leading to spot welding electrodes of the tweezer type (not shown) and operable in a circuit independent of that used for the electrodes shown in Figure 1.

Figure 4 is a reverse side view on a slightly enlarged scale of the control unit with parts in section and fragments broken away for convenience of illustration.

Figure 5 is a sectional end view on an enlarged scale taken approximately along the line 5—5 of Figure 4.

Figure 6 is a sectional plan view taken approximately along the line 6—6 of Figure 5.

Figure 7 is a reverse side view on a slightly enlarged scale of the welding device shown in Figure 1, with fragments broken away.

Figure 8 is a wiring diagram.

With continuing reference to the drawings and particularly to Figure 1, reference numeral 1 indicates a base plate across the rear portion of which is mounted a power supply cabinet 2 whose front wall 3 serves as a supporting panel for a powerstat and potentiometer control 4, a main switch 5, double pole double throw tweezer switch 6, volt meter 7 and "charging" and "ready" indicating lights 8 and 9 respectively.

Mounted upon the forward portion of the base plate is an electrode base 10 upon which is fixedly secured and insulated therefrom a stationary welding electrode 11. Also secured to the base 10 is a vertical column 12 upon which is adjustably mounted a head 13 and lockable to the column by means of a locking screw 14 (see Figure 3) provided with a hand wheel 15. The forward end of the head is vertically bored and internally threaded as at 16. Adjustably mounted within the top end of the bore is an externally threaded cylinder 17 lockable relative thereto by means of a locking ring 18. Operable within the cylinder is a piston 19 having a connecting rod 20 surrounded by a compression spring 21 whose top end bears against the piston and whose bottom end bears against a bushing 22 threaded into the bottom end of the bore 16 and through which the connecting rod slidably extends. The bottom end of the connecting rod is secured to one end of a cross bar 23 whose opposite end is secured to a vertical stabilizing shaft 24 slidably mounted in a bore 25 within the head 13. Accordingly, the electrodes may be arranged forwardly, as shown, or to either side of the head 13 for better visibility and accessibility and without danger of binding when in operation.

The interior of the top end of the cylinder 17 is in open communication with a pressure gauge 26 and with a pressure inlet fitting 27. To the underside of the forward end of the cross bar 23 is secured a companion welding electrode 28 in vertical alignment with the stationary welding electrode 11 and electrically grounded as at 28A and 28B. In electrical circuit with the electrodes 28 and 11 are two conductors T for supplying current to welding electrodes of the type referred to as "tweezers." Thus by applying varying degrees of pressure to the interior of the cylinder 17 the welding electrodes 11 and 28 can be correspondingly forced against workpieces disposed between them.

The control unit as shown in Figures 2, 4–6 comprises a base plate 30 upon which is mounted a pressure control cylinder 31 having a piston 32 operable therein, extending outwardly from one end thereof as at 33 and provided at its terminal end with an anti-friction bearing 34 at all times in contact with a cam plate 35 secured to and depending from the underside of a foot pedal 36. The foot pedal is pivotally supported near its rearward end by a shaft 37 carried by a pair of vertical brackets 38 secured to the base plate 30. The opposite end of the cylinder 31 (see Figure 6) is closed by a diaphragm 39 held in place by an endbell 40 with which is integrated a valve body 41. A compression spring 42 is interposed between one side of the diaphragm and the corresponding end of the piston 32. Bearing against the opposite side of the diaphragm is a disc 43 integrated with one end of a stem 44 of a spring urged valve 45 disposed within a chamber 46 and cooperating with a valve seat 47 formed at one end of an air passageway 48. The chamber is in open communication with an electrically controlled air valve 49 connected by a fitting 50 to a source of air pressure by a supply line not shown. The passageway 48 opens into a space 51 which is in open communication with air outlet ducts 52 and 53 connected respectively with a pressure line 54 and an air muffler 55. The opposite end of the pressure line is connected to the inlet fitting 27 (Figures 1 and 7) and thereby supplies pressure to the interior of the cylinder 17 above the piston 19.

Also pivotally carried by the shaft 37 of the control unit (Figures 2 and 4) is one end of a bar 57 whose opposite end is pivotally attached as at 58 to the bottom end of a link 59 attached at its top end to the outer end of an arm 60. The opposite end of the arm is in the form of a screw clamp 61 operable by a lever arm 62 threaded as at 63 into the elements of the clamp. By advancing the arm 62 on its threads the arm 60 can be locked in any desired position relative to a shaft 64 secured to the top end of a vertical column 65 secured at its bottom end to the base plate 30. Raising or lowering the lever arm 62 will correspondingly lower or raise the bar 57 relative to the foot pedal 36.

The bar 57 carries two micro switches 66 and 67 hereinafter referred to respectively as the "main switch" and the "tweezer switch." Both switches are adapted to be closed progressively by the downward movement of the foot pedal 36 about its pivot 37. Hence the raised or lowered position of the bar 57 relative to the foot pedal determines the amount of downward travel of the foot pedal necessary to close the main switch 66 and also the amount of forward thrust that will be imparted to the piston 32 by the cam plate 35 and as a consequence thereof the amount of air pressure supplied through the pressure line 54 to the interior of the cylinder 17 above the piston 19 therein.

With particular reference to the wiring diagram of Figure 8, the electrical operation of the device is as follows:

Closing main switch 5 causes 110 volts A. C. to flow from the source through wires 72 and 73 to transformer 74, powerstat 4 and the solenoid of air valve 49. Transformer 74 supplies 6.3 v. A. C. to pilot lights 8 and 9 depending on the position of double pole double throw switch 75 which is operated by relay coil 76. Powerstat 4 supplies from 0 to 135 volts A. C. (depending where its control knob on front panel 3 is set) to the primary 77 of transformer 78, inducing a voltage four times as high in the secondary. Selenium rectifier 79 changes the A. C. voltage to D. C. voltage which flows through wires 80 and 81 to condenser 82 (1000 microfarads) through relay coil 76 and switch 76A. Condenser 82 draws current when charging, which operates relay coil 76 moving switch 75 to a position which turns on red charging lamp 8 and renders relay coil 84 inoperative.

Current flowing in solenoid of air valve 49 allows air to flow to regulator valve 45 in the control unit. Transformer 74 also supplies power to vacuum tube 12AU7 which is rectified and filtered by 85 and 86. The vacuum tube is so arranged by grid resistors 87 (100,000 ohms) and load resistors 88 and 89 (10,000 ohms each) that current can only flow through one of the triode sections at a time, said sections being indicated generally at 90 and 91. Such flow occurs when a certain voltage is selected by turning the knob on powerstat 4. The 250,000 ohm potentiometer 92 is also turned setting a voltage which will make triode section 91 on the vacuum tube conduct operating relay coil 93, which opens switch 76A cutting off voltage to condenser 82. The fact that the voltage from transformer 78 and D. C. voltage through wires 80 and 81 is always higher than the selected voltage which potentiometer 92 selects, the charging time can be made very fast. As soon as pin 7 on the vacuum tube gets enough positive bias from the potentiometer triode section of pins 6, 7 and 8 on the vacuum tube it conducts relay coil 93, which opens switch 76A and disconnects voltage to 82 at desired setting. The shaft of the 250,000 ohm potentiometer 92 is connected to the wiper arm 94 of the powerstat 4. Thus the voltage at 80 and 81 will always be higher than the desired voltage at condenser 82.

Depressing foot pedal 36 of the control unit allows regulated air to flow to the welding head 13, bringing welding electrodes 28 and 11 together as aforesaid and also closes Micro switch 67. Further depressing of the foot pedal will exert greater pressure on the electrodes until the desired welding pressure is reached and will finally close the circuit through Micro switch 66 allowing 110 volts A. C. to flow from wire 72 through main switch 5, switch 66 and switch 75 to relay coil 84, which opens switch 95 and closes switch 96. Closing switch contacts 96 allows condenser 82 to discharge into the primary of transformer 97 which goes to the welding electrodes 28 and 11. Letting up on the foot pedal 36 opens switch 66, which cuts the current to relay coil 8, opening switch 96 and closing switch 95, allowing condenser 82 to charge again. Reversing the position of manual tweezer switch 6 cuts the current to solenoid air valve 49, making the air head inoperative but allowing Micro switch 67 to close the circuit to relay coil 84, firing power supply (or 82 into 97).

While I have shown and described a particular form of embodiment of my invention I am aware that many minor changes will readily suggest themselves to others skilled in the art without departing from the spirit and scope of the invention.

Having thus described my invention, what I claim as new and desire to protect by Letters Patent is:

1. An electric spot welder and control unit therefor, said spot welder comprising a first base, a vertical column mounted upon the base, a head slidably mounted upon the column, means carried by the head for locking the head in vertically adjusted positions relative to the column, vertically disposed fluid pressure-responsive means carried by the head, a movable welding electrode provided at the bottom end of the pressure-responsive means, a stabilizing shaft slidable within the head, paralleling the pressure-responsive means and connected thereto at one of its ends, a fixed welding electrode carried by the base and electrically insulated therefrom, said control unit comprising a second base remote from the first, a switch carried by the second base and in circuit with a source of electrical energy and with both of said electrodes, a foot lever pivotally attached to the second base for up and down movement in a vertical plane and adapted on initial downward movement to close said switch and the circuit to said electrodes, a fluid pressure control valve having an inlet side and outlet side carried by the second base and in communication at its inlet side with a source of fluid pressure and at its outlet side with control means carried by the base in communication with the pressure-responsive means and operable by continued downward movement of said foot lever for gradually releasing increasing degrees of pressure from said source to said pressure-responsive means.

2. An electric spot welder and control unit therefor as claimed in claim 1, wherein said control means comprises a valve housing having a chamber therein in controlled communication with said solenoid valve through a passageway and a valve cooperating with a valve seat in the passageway, said valve being operable gradually away from its seat by said continued downward movement of the foot lever, and said chamber being in communication with said pressure-responsive means whereby the supply of fluid pressure can be supplied to the latter in gradually increasing degrees independent of the supply of pressure from the source to the solenoid valve.

3. An electric spot welder and control unit therefor, said spot welder comprising a first base, a vertical column mounted upon the base, a head slidably mounted upon the column, means carried by the head for locking the head in vertically adjusted positions relative to the column, vertically disposed fluid pressure-responsive means carried by the head, a movable welding electrode provided at the bottom end of the pressure-responsive means, a stabilizing shaft slidable within the head, paralleling the pressure-responsive means and connected thereto at one of its ends, a fixed welding electrode carried by the base and electrically insulated therefrom, said control unit comprising a second base remote from the first, a switch carried by the second base and in circuit with a source of electrical energy and with both of said electrodes, a foot lever pivotally attached to the second base for up and down movement in a vertical plane and adapted on initial downward movement to close said switch and the circuit to said electrodes, a manual switch associated with the first base and in circuit with a source of electrical energy and with the solenoid of a solenoid valve having an inlet side and an outlet side, said inlet side being in full communication with a source of fluid pressure upon closing the manual switch and energization of said solenoid, the outlet side of the solenoid valve being in communication with control means carried by the base in communication with the pressure-responsive means and operable by continued downward movement of said foot lever for gradually releasing increasing degrees of pressure from said source to said pressure-responsive means.

4. An electric spot welder and control unit therefor as claimed in claim 3, wherein said control means comprises a valve housing having a chamber therein in controlled communication with said solenoid valve through a passageway and a valve cooperating with a valve seat in the passageway, said valve being operable gradually away from its seat by said continued downward movement of the foot lever, and said chamber being in communication with said pressure-responsive means whereby the supply of fluid pressure can be supplied to the latter in gradually increasing degrees independent of the supply of pressure from the source to the solenoid valve.

References Cited in the file of this patent

UNITED STATES PATENTS

| | | |
|---|---|---|
| 1,315,876 | Southhall | Sept. 9, 1919 |
| 2,283,826 | Soehner | May 19, 1942 |
| 2,712,585 | Domeny | July 5, 1955 |